United States Patent Office 2,983,689
Patented May 9, 1961

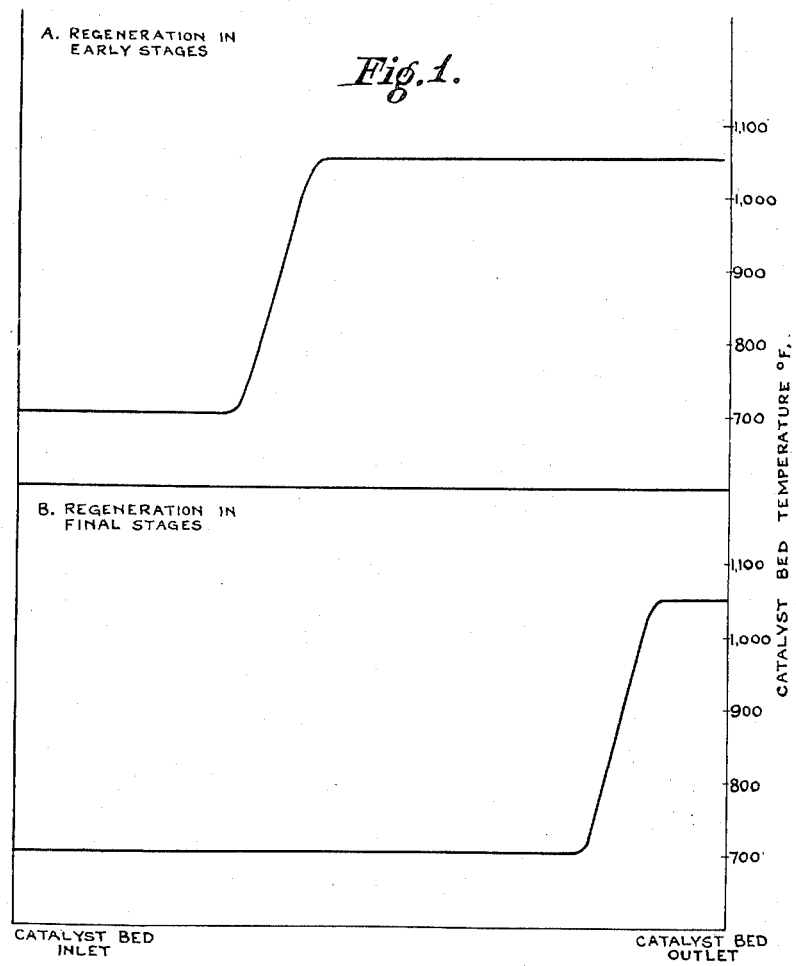

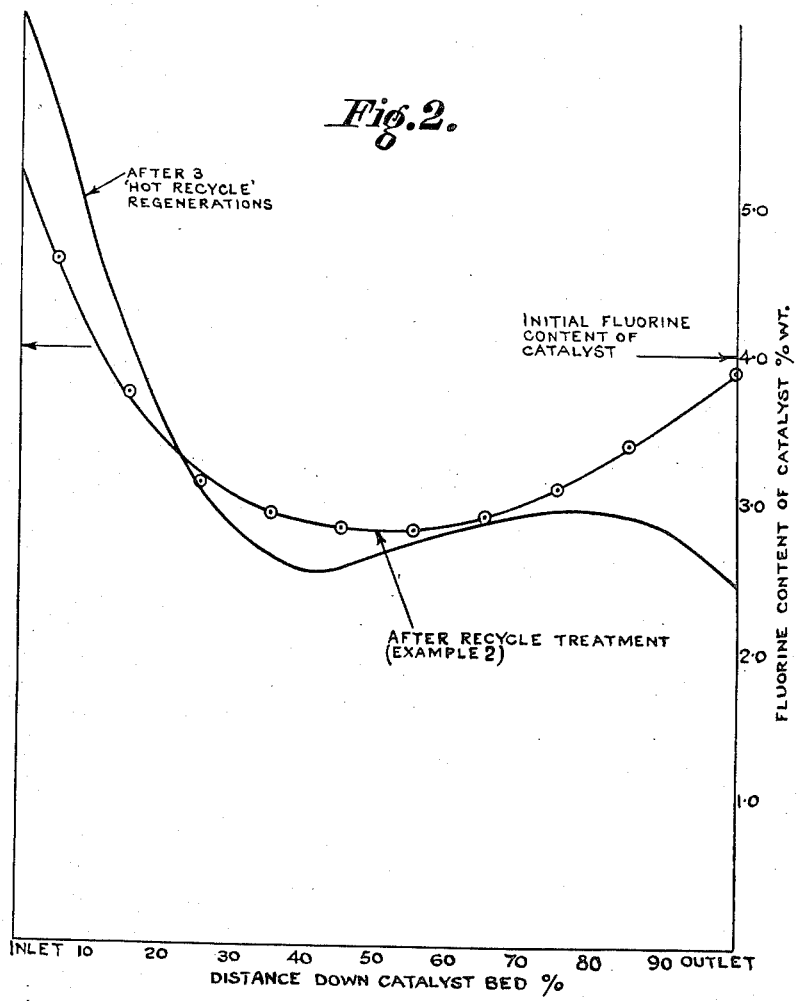

2,983,689
REDISTRIBUTION OF FLUORINE IN A HYDRODESULPHURIZATION CATALYST

Frederick William Bertram Porter, Roy Turner, and Ernest Carlton Housam, Sunbury-on-Thames, England, assignors to The British Petroleum Company Limited, London, England, a British joint-stock corporation Filed June 23, 1955, Ser. No. 517,457

Claims priority, application Great Britain June 24, 1954

1 Claim. (Cl. 252—420)

This invention relates to the hydrocatalytic desulphurization of petroleum feedstocks by means of the autofining process in which the feedstocks are contacted with a sulphur-resistant dehydrogenation-hydrogenation catalyst at elevated temperature and pressure such that sufficient hydrogen is produced by dehydrogenation of naphthenes contained in the feedstock to convert organically combined sulphur into hydrogen sulphide and to maintain an adequate hydrogen recycle without otherwise substantially changing the properties of the feedstock. The autofining process is described inter alia in British patent specifications Nos. 654,152, 669,536 and 669,553.

The preferred catalyst for the operation of the autofining process consists of the oxides of cobalt and molybdenum supported on alumina, and it was discovered that the dehydrogenating activity of this catalyst may be increased considerably by the incorporation in the catalyst of a controlled amount of fluorine varying between 1 and 6% by weight, and the preparation and use of such a fluorine-promoted catalyst is described in British patent specification No. 719,627. The use of the fluorine-promoted catalyst does not increase the degree of desulphurization obtainable at a fixed pressure so that such use is not beneficial with feedstocks that can be adequately desulphurized at pressures obtainable with the unpromoted catalyst. In the case of certain feedstocks, however, such as gas oils, the degree of desulphurization is not as great as could be desired when using the unpromoted catalyst, even when operating under the equilibrium pressure method as described in British patent specification No. 697,083, and according to which all the hydrogen-rich gases separated from the treated feedstock are recycled to the reaction zone and the pressure therein allowed to build up to an equilibrium pressure. In these circumstances, the use of the fluorine-promoted catalyst is extremely beneficial, since it enables a higher equilibrium pressure to be built up, thereby giving increased desulphurization.

The use of the fluorine-promoted catalyst, however, gives rise to the further problem that the catalyst loses fluorine during the regeneration period when it is subjected to higher temperatures than in the process period. The fluorine content can be restored to the initial value in various ways, for example by dissolving an organic fluoride in the feedstock, and providing a once through type of regeneration is employed, that is to say the regeneration gases are not recycled, it is possible not only to maintain the desired fluorine content of the catalyst, but also to maintain an even distribution of the fluorine throughout the catalyst mass. This last factor is important since it has been shown that there is both an upper and a lower limit to the fluorine content for maximum activity, and it would therefore be necessary to rectify any maldistribution of fluorine on the catalyst caused by regeneration. Such maldistribution occurs when the catalyst is subjected to "hot recycle" regeneration, according to which the greater part of the products of combustion are recycled to the reaction zone without the removal of acidic gases, and the principal object of the present invention is to provide a satisfactory method of remedying such maldistribution before the catalyst is reused in the process. It is often desirable, on economic grounds, to be able to use hot recycle regeneration.

It will be seen from Figure 1 of the accompanying drawings that there is a gradual fall in temperature along the catalyst bed as regeneration proceeds, and that for the greater part of the regeneration period the inlet part of the bed is at a temperature of about 700° F., while a progressively diminishing part of the bed is at a temperature of between 1000 and 1100° F. During hot recycle regeneration it is thought that hydrofluoric acid formed in the burning zone is recycled to the reactor inlet and is redeposited on the cooler part of the catalyst. Whatever the explanation, however, it is an observed fact that the fluorine content of the inlet part of the bed rises to a value considerably above the initial fluorine content of the catalyst before use, as will be seen from Figure 2 of the accompanying drawings with reference to the curve for the fluorine content after three hot recycle regenerations.

According to the present invention, the catalyst, after being subjected to hot recycle regeneration such that a maldistribution of fluorine on the catalyst has been brought about, is subjected to contact with steam or steam-containing gas which is recycled over the catalyst at elevated temperature and for a time sufficient to redistribute the fluorine on the catalyst to an adequate extent.

By this means, it is believed that fluorine is removed from the inlet end of the bed and is redeposited to a certain extent lower down the bed as the ratio of fluorine in the gas phase to fluorine on the catalyst becomes more favorable for fluorine deposition, but whatever the explanation, it is an observed fact that the distribution of the fluorine throughout the catalyst bed is much improved.

In general, the process may be carried out under the following preferred conditions.

Catalyst temperature _____ 800° F.–1000° F.
Recycle rate _____ 50–1000 volumes of gas per volume of catalyst per hour.
Pressure _____ Up to 200 p.s.i.g.
Steam in recycle gas_____ 10–100 vol. percent.

At a temperature of 800° F., the whole system is above the dew point of the recycle gas so that excessive corrosion is avoided.

The choice of conditions is not so critical when operating with recycle of the steam or steam-containing gas as when operating on a once-through basis, for the following reasons. In a once-through system, the total volume of gas leaving the unit during the treatment is equal to at least one hundred times the volume of catalyst and the gas enters the reactor free of fluorine. It is apparent therefore that the temperature, space velocity and pressure conditions have to be chosen so as to effect a reasonable compromise between the amount of fluorine lost, the extent of redistribution and the duration of the treatment. If the conditions are too severe or the duration too long, the fluorine loss will be high and the fluorine content of the catalyst at the inlet to the reactor may be reduced too far.

In a recycle treatment, there is no exit gas stream and the only hydrofluoric acid lost is that contained in the gases which are vented from the unit at the conclusion of the process, i.e. at atmospheric pressure in a commercial unit, a volume of gas approximately equal to 5 times the volume of the catalyst. The amount of hydrofluoric acid lost will depend upon the pressure of this gas and upon its hydrofluoric acid content but in any event the loss will be much smaller than it is with once-through operation. It is apparent that in this case the choice of conditions is not so critical as it is only required that the conditions should be sufficiently severe to achieve the required degree of redistribution in a reasonable time. If the conditions chosen are more severe than is strictly necessary no harm is done. The loss of fluorine is not significantly increased nor does the catalyst become depleted of fluorine at the inlet.

The invention will now be described with reference to the following examples.

Example 1

| | |
|---|---|
| Catalyst temperature | 800° F. |
| Recycle rate | 700 v./v./hr. |
| Pressure | Atmospheric. |
| Steam in recycle gas | 5.0 vol. percent. |
| Duration | 24 hours. |

CATALYST ANALYSES

| | After 3 "hot recycle" regenerations | After redistribution by recycling steam |
|---|---|---|
| Zone 1 (Inlet) | 5.9 | 4.25 |
| Zone 2 | 4.0 | 3.55 |
| Zone 3 | 3.1 | 3.1 |
| Zone 4 | 2.6 | 2.8 |
| Zone 5 | 2.5 | 2.8 |
| Zone 6 | 2.7 | 2.8 |
| Zone 7 | 2.9 | 2.8 |
| Zone 8 | 2.9 | 2.9 |
| Zone 9 | 2.9 | 3.0 |
| Zone 10 | 2.6 | 3.2 |

Example 2

| | |
|---|---|
| Catalyst temperature | 1000° F. |
| Recycle rate | 700 v./v./hr. |
| Pressure | Atmospheric. |
| Steam in recycle gas | 15 vol. percent. |
| Duration | 2 hours. |

CATALYST ANALYSES

| | Catalyst as charged | After redistribution by recycling steam |
|---|---|---|
| Zone 1 (Inlet) | 5.9 | 4.6 |
| Zone 2 | 4.0 | 3.7 |
| Zone 3 | 3.1 | 3.1 |
| Zone 4 | 2.6 | 2.9 |
| Zone 5 | 2.5 | 2.8 |
| Zone 6 | 2.7 | 2.8 |
| Zone 7 | 2.9 | 2.9 |
| Zone 8 | 2.9 | 3.1 |
| Zone 9 | 2.9 | 3.4 |
| Zone 10 (Outlet) | 2.6 | 3.9 |

The improved fluorine distribution brought about in Example 2 is illustrated in Figure 2.

We claim:

The method of treating a hot recycle regenerated catalyst mass consisting essentially of the oxides of cobalt and molybdenum on alumina and containing from 1 to 6% by weight of fluorine which has been maldistributed in the catalyst mass by the hot recycle regeneration of same, to more substantially uniformly distribute the fluorine throughout the catalyst mass, which method comprises, recycling a gas containing from 10 to 100% by volume of steam over the regenerated catalyst mass in a contacting zone at a rate of 50 to 1000 volumes of gas per volume of catalyst per hour, at a temperature of 800 to 1000° F., a pressure not in excess of 200 p.s.i.g., and for a period of time from 2 hours to 24 hours whereby the fluorine content of the treated catalyst is substantially the same in each zone of any given pair of zones in the catalyst mass, the respective units of which pair lie at opposite sides of, and at equal distances from, the midpoint of the distance down the catalyst mass from the inlet end thereof to the outlet end thereof and within the portion of the catalyst mass extending from about 20% to 80% of said distance, the fluorine content of the catalyst within said portion increasing from substantially a minimum value at said midpoint to substantially the same maximum value at the respective end zones of said portion.

References Cited in the file of this patent

UNITED STATES PATENTS

| 2,479,885 | West | Aug. 23, 1949 |
| 2,642,383 | Berger | June 16, 1953 |
| 2,646,388 | Crawford | July 21, 1953 |
| 2,668,798 | Plank | Feb. 9, 1954 |
| 2,755,231 | Blanding et al. | July 17, 1956 |

FOREIGN PATENTS

| 719,627 | Great Britain | Dec. 8, 1954 |